Patented May 3, 1949

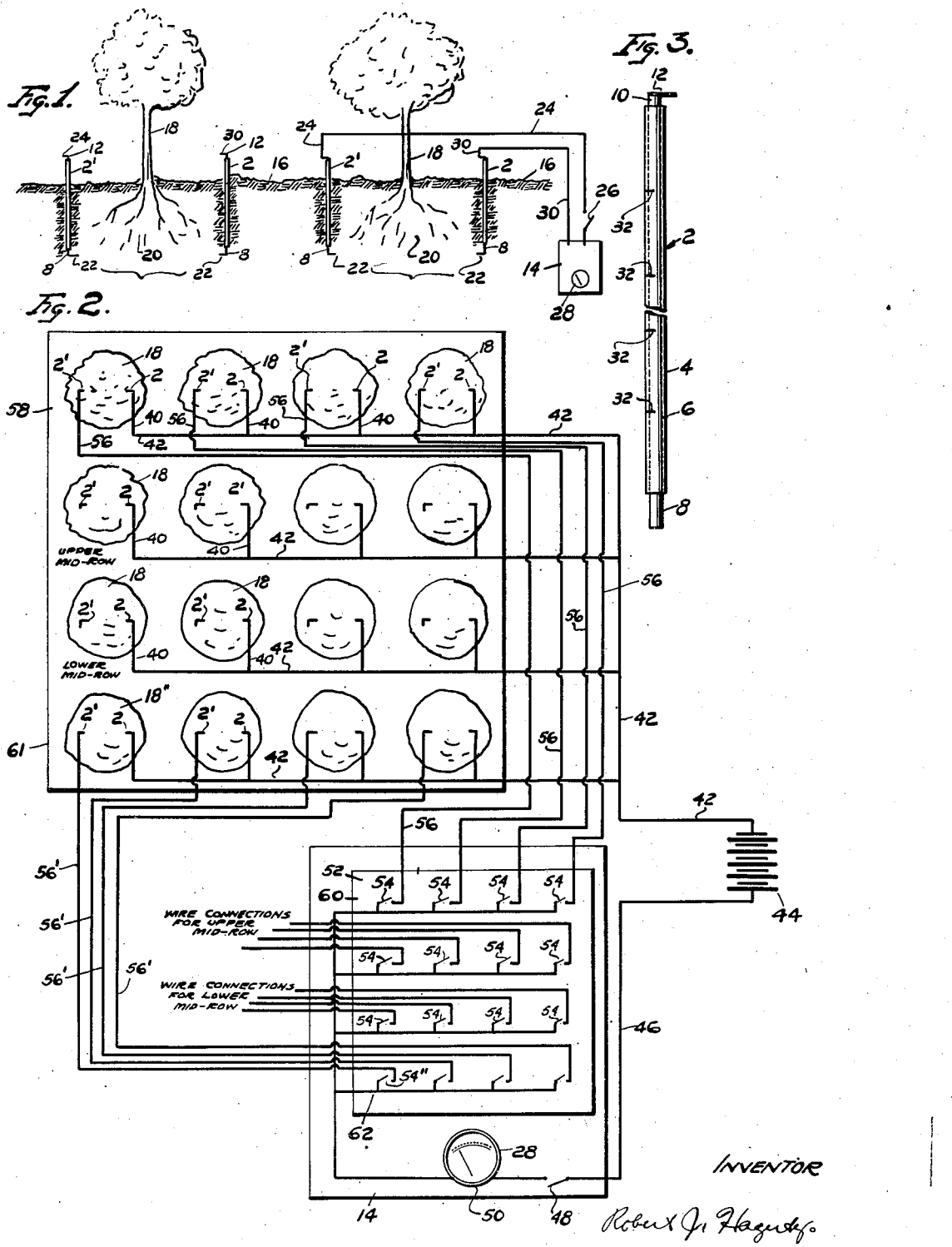

2,468,972

UNITED STATES PATENT OFFICE 2,468,972

MOISTURE MEASURING AND CALIBRATING APPARATUS FOR TREE CULTURE

Robert J. Hagerty, San Gabriel, Calif.

Application December 3, 1945, Serial No. 632,554

1 Claim. (Cl. 47—1.3)

My invention relates to moisture indicators and more particularly to apparatus especially adapted for locating and for measuring the position of moisture within a given area.

Manifestly said invention relates to an apparatus and a system which may be used for measuring and calibrating moisture and its position within a given area, such as in a fruit orchard, so that an over-irrigation may be prevented, and thereby insuring a healthy growth of tree roots and consequently its foliage and fruit, also, to provide a positive indication when the soil in an orchard, garden, vegetable field or plot or a lawn requires water and should be irrigated, for securing the best results.

Also, the object of my invention is to provide a suitable electrical measuring means, with which an accurate calibration of moisture may be secured in such products as soaps, powders, dehydrated foodstuffs, flour, granular and plastic molding materials, for maintaining high quality of production and reducing waste of materials.

The foregoing invention eliminates the slow oven-and-scale method of determining moisture in soil or materials, or the measuring of moisture content of powdered or granular ingredients, and the use of said invention and said system provides a positive calibration means for the moisture content which is accomplished in a simple, inexpensive, highly efficient and precise method, in which a highly sensitive electronic apparatus is employed, and which when in use, is to the advantage of a farmer, fruit grower or a manufacturer, whereby the spoilage of fruit, material or foodstuffs, fresh grown or stored is entirely eliminated and controlled.

Accordingly, an object of my invention is to provide an apparatus which is provided with a suitable electronic means and which is adapted for locating the moisture, by measuring and calibrating the resistance between two or a plurality of designated points of contact, disposed within a given area.

A further object of my invention is to provide a system and an apparatus having in combination a suitable contact means adapted for locating the depth of moisture within a given area, or a combination of areas which are to be measured and calibrated, and thereby positively locating and recording the position of moisture within the area so designated.

Another object of my invention is to provide a combine of an apparatus and a system with which to instantaneously locate and calibrate the position of moisture within a given area or any particular portion thereof.

Another object of my invention is to provide an apparatus and system, which is so arranged whereby its use and application may be employed for calibrating the moisture in the field, granaries, storage bins, or other places where foodstuffs or other materials are stored.

My invention also has for its objects to provide such means that are positive in operation, convenient in use, easily installed in a working position and easily disconnected therefrom, economical in manufacture, relatively simple, and of general superiority and serviceability.

The invention also comprises novel details of construction and novel combination and arrangements of parts, which will more fully appear in the course of the following description.

In the drawings is shown one method of applying the system and apparatus for measuring and calibrating moisture, within soil, in which:

Fig. 1 shows an elevational and partly sectional view of trees in an orchard, showing the position of conductors used in locating the position of moisture at the roots of said trees.

Fig. 2 shows a typical plan of an orchard and the trees, provided with a plurality of conductors which are disposed therein in a suitable pattern, also having an instrument panel provided with wires connecting said conductors.

Fig. 3 is a fragmentary and elevational view of a conductor.

Describing my invention more in detail, in its broader aspects, said invention comprises a conductor generally designated by numeral 2, having a suitable insulator covering 4 and a rod member 6, of which the lower end thereof, as at 8 is exposed for approximately four to six inches, while the upper end 10 of said rod member 6 is provided with a suitable connector 12, to which a wire or other suitable electric current carrying means is connected.

Said invention also comprises a suitable resistance measuring device, comprising an ohm meter which is disposed in an apparatus 14, the use and operation of which will be presently described.

When in use, one of said conductors 2 is placed into the soil 16 and in close proximity to the trunk of a tree 18, the position of which is partly away from the tree roots 20, then another conductor 2' is placed in a diametrically opposite side of said tree trunk, so that the cross area 22 of the soil and across the tree roots may be calibrated for moisture.

Said conductor 2' is provided with a lead wire 24 which connects with a suitable switch 26 and also connecting a terminal of the apparatus 14.

Said apparatus 14 is provided with a resistance measuring ohm meter having a dial 28, while said conductor 2 is connected to another terminal of said apparatus 14 by means of a lead wire 30.

A lack of moisture in said soil 16 and around said tree roots 20, provides a high resistance upon said ohm meter which is read upon said dial 28 of said apparatus 14 when said switch 26 is closed, while the moisture present in said soil lowers the resistance, which is recorded upon said dial 28 accordingly.

In this manner the depth of the moisture may also be calibrated, because the resistance of the electrical current is measured and calibrated when it passes at the exposed ends 8 of said conductors 2 and 2' respectively, therefore, the depth calibrating indicia 32 provided upon said insulator covering 4 may be used for calculating the depth at which moisture in said soil is present.

It may also be noted that in the system used in which the electric current is caused to pass between the two exposed rod ends 8, said electric current activates the bacteria of the soil and the fertilizing agents carried to the roots by the moisture seeping to the low level from the surface and thereby stimulating the growth of the tree and its fruit.

It may further be noted, that in permanent installations, said exposed rod ends 8 may be provided with a suitable plate, (not shown) or a metal plate of suitable size may be buried in said soil at a required depth and connected with a water proof insulating wire, to which said apparatus 14 may be connected, for securing the moisture content of the soil.

Said plates may be placed in strategic locations, upon a field growing corn, vegetables, lawn or the like, so that the resistance between them may be measured, thus giving a moisture content at any particular location.

Also, said installation may be made in an orchard, as shown in Fig. 2, wherein each tree 18 is provided with a pair of conductors 2 and 2', and wherein each conductor 2 is connected by means of lead wires 40 to a main lead wire 42 and connecting a battery 44 at one of its terminals, while the other terminal of said battery is connected by means of lead wire 46 to a switch 48 and also connecting the ohm meter 50 provided with a dial member 28.

Said apparatus 14 is also provided with a panel 52 upon which a plurality of suitable switches 54 are positioned, each representing the respective location of the tree 18 upon the field.

Each of said conductors 2' is provided with a lead wire 56 which leads to and connects with its respective switch 54 disposed upon said panel, so that said pair of conductors 2 and 2' disposed in close proximity to said tree 18 and their respective wire connections in the farmost row 58 upon the field connects with the top row 60 upon said panel, while said connectors around the tree 18" disposed in the first row 61 of the field connects with the switch 54" of the lowermost row 62 of said panel 52.

In this manner any tree upon said field may be located on said panel 52, which is accomplished by closing the switch 48 which connects said battery 44 and said ohm meter 50, and then, in closing any switch 54 or a combination of them upon said panel 52, the resistance of the soil and moisture content across the tree roots of the respective trees, or any combination of them, may then be read and noted upon said dial 28 of said apparatus 14.

It is obvious to note, that said meter 50 may, if so desired, be connected to a suitable relay and transformer, (not shown) with which to operate a suitable water spraying or water flow controlling device, thus causing it to operate when the resistance becomes high or above the normal, and which will also cause the water to cease flowing, automatically, when said resistance reaches its low point, and which will indicate that the water content is sufficient and that said soil around said trees is not in need of further irrigation.

Said apparatus 14, if so desired, may be provided with a suitable zero type ohm meter, for eliminating an error, in the operation of said apparatus.

While I have thus described my invention with great particularity, it will be clear that the same may be modified throughout a wide range.

I accordingly do not propose to be limited to the exact details of construction herein shown on the drawings and described in the specification, but reserve the rights in practice to make the necessary changes and modifications therein, which may come within the scope of the appended claim.

I claim as my invention:

In a system of the class described adapted for measuring resistance and moisture content at the roots of trees in a field, comprising, a plurality of insulated conductors disposed in pairs at each tree trunk and positioned diametrically opposite to each other, an exposed end in each of said conductors positioned at an approximate lowermost root depth of said trees, a lead wire connector at the upper end of each of said conductors for connecting electric current carrying lead wires thereto, a panel means in said system, a plurality of switches on said panel means for designating the position of each tree on said field and for connecting said lead wires leading from each pair of conductors disposed in close proximity to the respective tree, and ohm meter in the circuit of said system for determining resistance between the respective conductors of any tree when the respective switch is closed and for measuring moisture content at the lowermost root depth of each tree.

ROBERT J. HAGERTY.

REFERENCES CITED

The following references are of record in the file of this patent:

UNITED STATES PATENTS

| Number | Name | Date |
|---|---|---|
| Re. 7,939 | Adams | Nov. 6, 1877 |
| 361,520 | Hill | Apr. 19, 1887 |
| 736,411 | Leonard | Aug. 18, 1903 |
| 873,375 | Jones | Dec. 10, 1907 |
| 1,172,367 | Kitsee | Feb. 22, 1916 |
| 1,737,866 | Roe | Dec. 3, 1929 |
| 2,015,401 | Jakosky | Sept. 24, 1935 |
| 2,031,146 | Dodge | Feb. 18, 1936 |
| 2,172,778 | Taylor | Sept. 12, 1939 |
| 2,207,060 | Jakosky | July 9, 1940 |
| 2,429,412 | Keller | Oct. 21, 1947 |

FOREIGN PATENTS

| Number | Country | Date |
|---|---|---|
| 766,755 | France | Apr. 23, 1934 |
| 11,997 | Great Britain | 1913 |
| 36,689 | Switzerland | May 21, 1906 |

OTHER REFERENCES

Pop. Sci. Mo., vol. 135 (Oct. 1939), p. 63.